(12) United States Patent
Powers et al.

(10) Patent No.: US 8,521,191 B2
(45) Date of Patent: Aug. 27, 2013

(54) SYSTEM AND METHOD FOR DETERMINING A LOCATION FOR A MOBILE DEVICE

(75) Inventors: Michael W. Powers, Shallowater, TX (US); Shad L. Holt, Lubbock, TX (US); Stephen P. Frisbie, Lubbock, TX (US); John W. Walter, Lubbock, TX (US); Adam V. Behnke, Slaton, TX (US); Mark T. Sheeter, Ropesville, TX (US)

(73) Assignee: Global Business Software Development Technologies, Inc., Lubbock, TX (US)

( * ) Notice: Subject to any disclaimer, the term of this patent is extended or adjusted under 35 U.S.C. 154(b) by 0 days.

(21) Appl. No.: 13/550,717

(22) Filed: Jul. 17, 2012

(65) Prior Publication Data

US 2012/0281584 A1 Nov. 8, 2012

Related U.S. Application Data

(62) Division of application No. 12/832,162, filed on Jul. 8, 2010, now Pat. No. 8,238,941.

(51) Int. Cl.
*H04Q 7/20* (2006.01)
(52) U.S. Cl.
USPC ............... 455/456.5; 455/456.1; 455/456.6; 701/211
(58) Field of Classification Search
USPC ............... 455/456.5, 456.1, 456.6; 701/211
See application file for complete search history.

(56) References Cited

U.S. PATENT DOCUMENTS

| 4,812,852 | A | * | 3/1989 | Bent et al. | 342/457 |
|---|---|---|---|---|---|
| 4,916,455 | A | * | 4/1990 | Bent et al. | 342/457 |
| 5,526,357 | A | * | 6/1996 | Jandrell | 370/346 |
| 5,539,744 | A | * | 7/1996 | Chu et al. | 370/397 |
| 7,295,566 | B1 | * | 11/2007 | Chiu et al. | 370/419 |
| 2003/0195702 | A1 | | 10/2003 | Koga | |
| 2005/0033124 | A1 | * | 2/2005 | Kelly et al. | 600/300 |
| 2007/0280182 | A1 | * | 12/2007 | Wisherd et al. | 370/338 |
| 2008/0305785 | A1 | | 12/2008 | Ito | |
| 2009/0063187 | A1 | | 3/2009 | Johnson et al. | |
| 2009/0090780 | A1 | | 4/2009 | Clark et al. | |
| 2009/0201916 | A1 | * | 8/2009 | Caron et al. | 370/352 |
| 2009/0279520 | A1 | | 11/2009 | Maki | |
| 2010/0016011 | A1 | | 1/2010 | Alen | |
| 2010/0197222 | A1 | | 8/2010 | Scheucher | |

* cited by examiner

*Primary Examiner* — Danh Le
(74) *Attorney, Agent, or Firm* — Baker Botts L.L.P.

(57) ABSTRACT

A system for determining a location for a mobile communication device includes a plurality of taps, a multiplexer, and a link aggregator. Each tap includes a pair of connectors that couple to a communication link of a radio access network inline and pass between them a signal received over the communication link. Each tap also includes a multiplexer connector that couples to a multiplexer and a cable connecting the multiplexer connector to the inline connectors. The tap replicates signals passing between the inline connectors and propagates the replicated signals to the multiplexer connector. The multiplexer receives, from each tap, signals replicated by that tap, extracts location data from the received signals, and transmits the location data to a link aggregator. The link aggregator receives the location data from the multiplexer and determines a location for one of the mobile devices based on the received location data.

9 Claims, 3 Drawing Sheets

SYSTEM AND METHOD FOR DETERMINING A LOCATION FOR A MOBILE DEVICE

RELATED APPLICATIONS

This application is a divisional of U.S. application Ser. No. 12/832,162 filed Jul. 8, 2010, entitled, "System and Method for Determining a Location for a Mobile Device."

TECHNICAL FIELD OF THE INVENTION

This invention relates in general to mobile phones, and more particularly to locating mobile devices.

BACKGROUND OF THE INVENTION

Mobile communication devices have become ubiquitous in recent years. Countless individuals communicate with one another using mobile communication devices and, as a result, many people have access to a communication device at all times. This increased availability has led to greater safety for pedestrians, motorists, and other individuals in situations where they do not have access to conventional landline telephones.

Unlike with conventional landline telephones, however, there is no a fixed association between a mobile communication device and its location. As a result, in emergency situations, emergency service providers cannot determine the location of a caller calling on a mobile device based simply on the phone number associated with the device. If the caller becomes incapacitated during the call, disconnected, or otherwise prevented from communicating with the emergency service provider, the emergency service provider may be unable to locate and assist the caller. Furthermore, even if the caller is able to communicate with the emergency service provider, in many cases the caller may be unable to determine his or her location. As a result, there is an increasing need for effective techniques to establish the location of mobile communication devices.

However, the surge in mobile communications has led to increasingly complex communication networks, as service providers struggle to accommodate the ever-growing number of users. As a result of this complexity, interfacing with and extracting information from mobile communication networks has likewise increased in complexity. Components and systems designed to interoperate with mobile communication devices have become more expensive and complicated, hampering the development and implementation of solutions for locating mobile communication devices.

SUMMARY OF THE INVENTION

In accordance with the present disclosure, certain disadvantages and problems associated with mobile communication have been substantially reduced or eliminated. In particular, an apparatus and method for determining the location of a mobile communication device is provided.

In accordance with one embodiment of the present disclosure, a system for determining a location for a mobile communication device includes a plurality of taps, a multiplexer, and a link aggregator. Each tap includes a pair of connectors that couple inline to a communication link of a radio access network and pass between them a signal received over the communication link. Each tap also includes a multiplexer connector that couples to a multiplexer and a cable connecting the multiplexer connector to the inline connectors. The tap replicates signals passing between the inline connectors and propagates the replicated signals to the multiplexer connector. The multiplexer receives, from each tap, signals replicated by that tap, extracts location data from the received signals, and transmits the location data to a link aggregator. The link aggregator receives the location data from the multiplexer and determines a location for one of the mobile devices based on the received location data.

In accordance with another embodiment of the present invention, a method for determining a location for a mobile communication device includes receiving, at each of a plurality of taps, a signal transmitted over a corresponding communication link of a radio access network. Each of the taps comprises a pair of connectors coupled inline to the corresponding communication link. The method also includes passing the signal received at each tap between the corresponding pair of connectors and replicating the signal received at each tap on a multiplexer connector of the tap. Additionally, the method includes receiving the signal replicated by each of the taps at a multiplexer coupled to the taps and extracting location data from the received signals. The location data is associated with one or more mobile devices operating in a geographic area served by the radio access network. The method further includes transmitting the location data over a data network in accordance with an internet protocol (IP) to a link aggregator and determining, at the link aggregator, a location for one of the mobile devices based on location data received from the multiplexer.

Important technical advantages of certain embodiments of the present invention include determining a location of a mobile device using an inexpensive, compact system with reduced complexity. Particular embodiments may be capable of determining locations independent of the communications system on which the caller is communicating. Additionally, particular embodiments allow extraction of information relevant to the location of the mobile communication device without establishing additional communication links between the extracting apparatus and downstream nodes in the communication network. Other advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
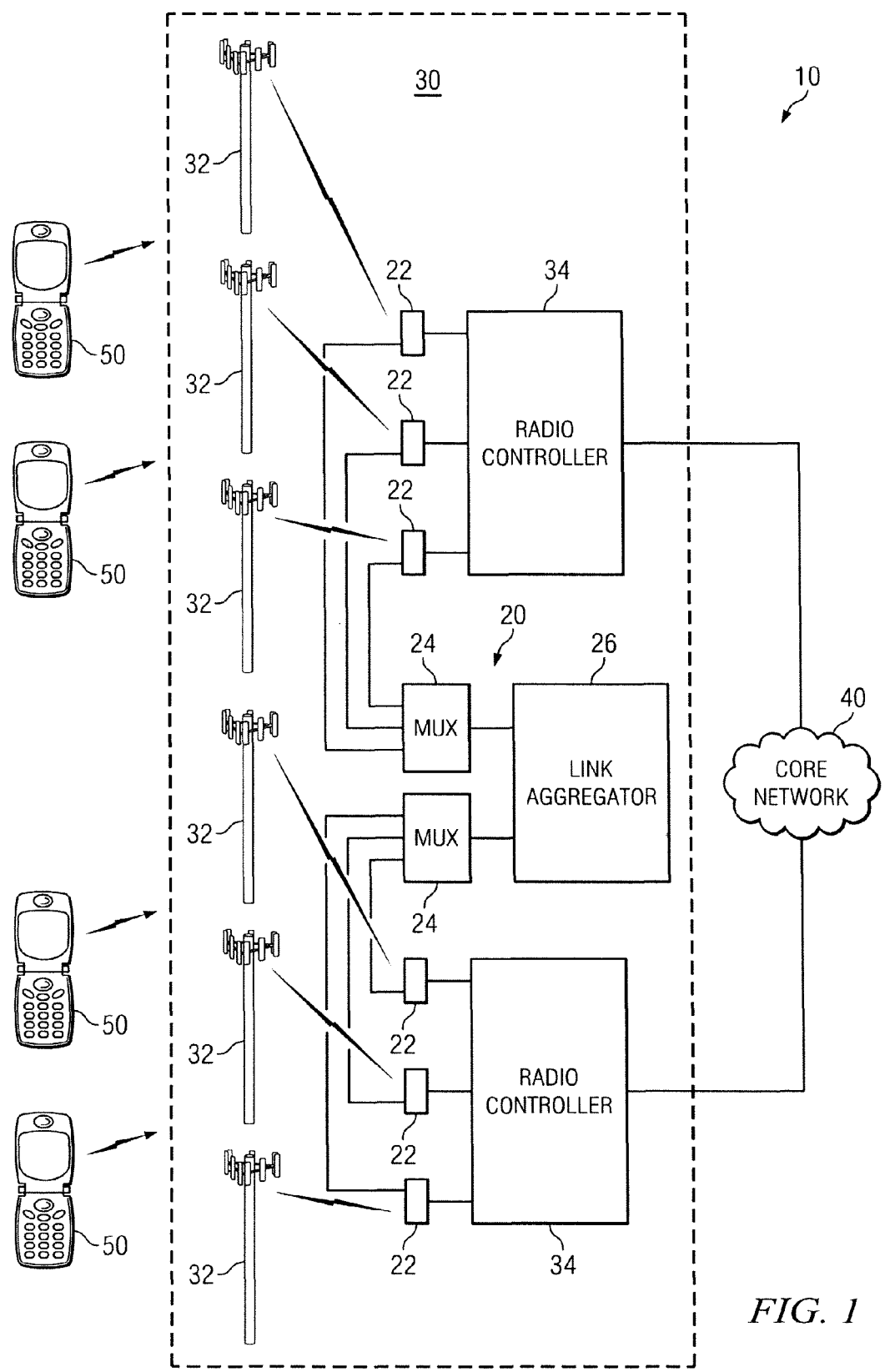
FIG. 1 illustrates a mobile communication system and an intercept system according to one embodiment of the present disclosure.

FIG. 1 illustrates a mobile communication system 10 in which an intercept system 20 has been installed. Mobile communication system 10 provides mobile communication service to a plurality of mobile communication devices 50. Intercept system 20 extracts data from information communicated between various elements of mobile communication system 10 and uses the extracted data to determine locations of mobile devices 50. In particular embodiments, intercept system 20 is capable of transparently extracting and aggregating location data transmitted within mobile communication system 10 and may provide a cost-effective solution for locating mobile devices 50 served by mobile communication system 10.

Mobile communication system 10 provides mobile communication service to mobile devices 50 operating within a geographic area associated with mobile communication system 10. Mobile communication system 10 includes an access network 30 and a core network 40. Mobile communication system 10 may support communication of any suitable type and/or in accordance with any appropriate communication standards including, but not limited to, any second generation ("2G"), third generation ("3G"), or fourth generation ("4G") standards, or any suitable transitional generation standards (e.g., 2.5G, 2.75G, 3.5G, and 3.9G). Particular embodiments of mobile communication system 10 may support communications in accordance with, for example, Global System for Mobile Communications (GSM), CDMAOne, General Packet Radio Service (GPRS), Enhanced Data rates for GSM Evolution (EDGE), CDMA2000, Integrated Digital Enhanced Network (iDen), Universal Mobile Telecommunications System (UMTS), Wideband Code Division Multiple Access (WCDMA), Long Term Evolution (LTE), and/or Worldwide Interoperability for Microwave Access (WiMAX) communication standards.

Access network 30 communicates wirelessly with mobile devices 50 and serves as an interface between mobile devices 50 and core network 40. Access network 30 may represent or include a radio access network and/or any elements responsible for providing a radio or air interface for core network 40. For example, in the illustrated embodiment, access network 30 includes base stations 32 and radio controllers 34.

Base stations 32 communicate wirelessly with mobile devices 50 to facilitate mobile communication for mobile devices 50. Base stations 32 may include any appropriate elements to communicate with mobile devices 50 and to interface mobile devices 50 with core network 40. For example, depending on the communications standards supported by access network 30 and core network 40, each base station 32 may represent or include a conventional base station, a Node B, an evolved Node B (eNode B), a radio base station (RBS), or any other suitable element capable of communicating with mobile devices 50 wirelessly.

Radio controllers 34 control the operation of base stations 32 and interact with appropriate elements of core network 40. Radio controllers may include any appropriate elements to manage the operation of base stations 32. In particular embodiments, radio controllers 34 may be responsible for managing radio channels used by base stations 32, managing handoffs between base stations 32, concentrating communication channels transmitted by base stations 32, and/or otherwise managing the operation and interoperation of base stations 32 and interfacing base stations 32 with core network 40. For example, depending on the communications standards supported by access network 30 and core network 40, radio controllers 34 may each represent or include a base station controller (BSC), a radio network controller (RNC), or any other suitable collection of hardware and/or software appropriate for controlling base stations 32.

Core network 40 routes voice and/or data communicated by mobile devices 50 from access network 30 to other mobile devices 50 or to other communication devices coupled to core network 40 through landline connections or through other networks. In particular embodiments, core network 40 may include a backbone network and any backhaul elements connecting access network 30 to the backbone network. Core network 40 may support any appropriate standards or techniques for routing such communications. For example, in embodiments of mobile communication system 10 that support GSM or UMTS, core network 40 may represent a Mobile Application Part (MAP) core network, while in embodiments of mobile communication system 10 that support CDMA2000, core network 40 may represent an IS-41 core network. Additionally, core network 40 may also be responsible for aggregating communication for longhaul transmission, authenticating users, managing user mobility, providing call control, billing, or other functionality associated with providing communication services to mobile devices 50. In particular embodiments, core network 40 may include separate subnetworks for circuit-switched and packet-switched communication. For example, in embodiments that support GSM communication, core network 40 may include a network switching subsystem and any mobile switching centers (MSCs) for providing circuit-switched services, as well as a GPRS core network and any Gateway GPRS Support Nodes (GGSNs) and Serving GPRS Support Nodes (SGSNs) for providing packet-switched services. In general, however, core network 40 may include any components suitable for routing and supporting voice and/or data communications for mobile devices 50.

Intercept system 20 extracts information from appropriate communication links within mobile communication system 10 and, based on the extracted information, determines locations for particular mobile devices 50 served by mobile communication system 10. In particular embodiments, intercept system 20 may be capable of collecting information from multiple base stations 32 and aggregating the collected information, thereby permitting intercept system 20 to determine and store locations for several different mobile devices 50 located throughout the geographic area served by mobile communication system 10. Although intercept system 20 may include any appropriate elements suitable to provide the described functionality, the illustrated embodiment of intercept system 20 includes a plurality of taps 22, a plurality of multiplexers 24, and a link aggregator 26.

Taps 22 couple to base stations 32, radio controllers 34, or other suitable elements of access network 30 and replicate information communicated over communication links of mobile communication system 10. Taps 22 may, in various embodiments, couple to such links as those between mobile devices 50 and base stations 32, base stations 32 and radio controllers 34, or between radio controllers 34 and core network 40. In particular embodiments, taps 22 are passive elements that replicate information from the appropriate links or interfaces by splitting signals passing through taps 22 without altering the duplicated signals from the perspective of the elements transmitting and receiving the relevant signals. This may allow taps 22 to replicate the relevant signals in a manner that is transparent to the transmitting and receiving elements. As a result, taps 22 may be able to avoid performing handshakes with upstream or downstream elements, maintaining protocol stacks, and/or providing other functionality required of nodes communicating within access network 30 or core network 40. Consequently, particular embodiments of taps 22 may be designed and manufactured with less complexity and cost than if taps 22 operated as fully functional nodes within access network 30 or core network 40. Taps 22 may represent any appropriate combination of hardware and/or software suitable to provide the described functionality. The structure and operation of a particular embodiment of tap 22 is described in greater detail below with respect to FIG. 2.

Multiplexers 24 are each associated with a plurality of taps 22 and receive signals replicated by their associated taps 22. Multiplexers 24 process information conveyed by the signals received from taps 22 and prepare the information for transmission to link aggregator 26. Although multiplexers 24 may be designed to couple to any suitable number of taps 22, particular embodiments of intercept system 20 utilize multiplexers 24 configured to couple to all of the taps 22 installed at a particular base station 32 or radio controller 34. Although multiplexers 24 may represent any appropriate combination of hardware and/or software suitable to provide the described functionality, particular embodiments comprise field-programmable gate arrays (FPGA) programmed to provide appropriate processing of the signals received from taps 22. The structure and operation of a particular embodiment of multiplexer 24 is described in greater detail below with respect to FIG. 3.

Link aggregator 26 determines locations of various mobile devices 50 receiving service from mobile communication system 10 based on information received from multiplexers 24. Although in the illustrated embodiment multiplexers 24 connect to link aggregator 26 through a separate data network (not shown), link aggregator 26 may connect to multiplexers 24 over a separate data network, through core network 40, via direct connections to multiplexers 24, or in any other appropriate manner. Link aggregator 26 may also represent any appropriate combination of software and/or hardware suitable to provide the described functionality. In particular embodiments, link aggregator 26 represents a personal computer (PC) or server capable of receiving internet protocol (IP) transmissions from multiplexers 24. For example, in particular embodiments, link aggregator 26 represents a Sun X4270 server suitably programmed to provide the described functionality.

In operation, mobile communication system 10 provides telecommunication service to mobile devices 50. For example, in the illustrated embodiment, base stations 32 communicate wirelessly with mobile devices 50 to facilitate the transmission of information between mobile devices 50 and core network 40. Radio controllers 34 manage handovers between base stations 32 and otherwise coordinate interaction of associated base stations 32. Core network 40 transports voice and/or data between individual base stations 32 and between base stations 32 and other elements of mobile communication system 10, such as wireline communication devices.

Intercept system 20 extracts information transmitted between mobile devices 50 and mobile communication system 10 and, based on the extracted information, determines locations of the relevant mobile devices 50. In particular embodiments, intercept system 20 may be capable of collecting information from multiple base stations 32 and/or radio controllers 34 and aggregating the collected information, thereby permitting intercept system 20 to determine locations for several different mobile devices 50 spread throughout the geographic area served by mobile communication system 10. Furthermore, intercept system 20 may, in particular embodiments, be capable of extracting the relevant information from mobile communication system 10 transparently, permitting intercept system 20 to be installed and operated with reduced difficulty and expense.

For example, as noted above, the illustrated embodiment of intercept system 20 includes a plurality of taps 22, a plurality of multiplexers 24, and a link aggregator 26. Taps 22 are coupled to appropriate communication links in mobile communication system 10, such as those between mobile devices 50 and base stations 32, base stations 32 and radio controllers 34, or between radio controllers 34 and core network 40. Taps 22 replicate the signals transmitted in mobile communication system 10. As one example, in embodiments of mobile communication system 10 that support GSM, taps 22 may be coupled to either a BTS (serving as a base station 32) or a BSC (serving as a radio controller 34) and replicate signals transmitted over the Abis interface connecting the BTS and BSC or taps 22 may be coupled to the BSC (serving as radio controller 34) or an MSC (within core network 40) and replicate signals transmitted over the A interface connecting the BSC and MSC. As another example, in embodiments of mobile communication system 10 that support UMTS, taps 22 may be coupled to either a NodeB (serving as a base station 32) or an RNC (serving as a radio controller 34) and replicates signals transmitted over the Iub interface connecting the NodeB and the RNC. Similarly, taps 22 may be coupled to an RNC and replicate signals communicated over an Iur interface (with another RNC), an Iu-CS interface (with an MSC in core network 40), or an Iu-PS interface (with an SGSN in core network 40). In general, various embodiments of taps 22 may be capable of coupling to any appropriate element of access network 30 and replicating signals on any appropriate communication links associated with access network 30.

Each tap 22 is coupled to a multiplexer 24 to which the signals replicated by that particular tap 22 are transmitted. For example, in particular embodiments, each tap 22 replicates a set of E1 transmit/receive signal pairs that propagate to the multiplexer 24 associated with that tap 22. Multiplexers 24 receive signals from a plurality of taps 22 and process these signals for transmission to link aggregator 26. Multiplexers 24 may process replicated signals in any appropriate manner to facilitate the transmission of relevant information to link aggregator 26. In particular embodiments, multiplexer 24 conditions signals received from taps 22 for use by multiplexer 24 or link aggregator 26. For example, in particular embodiments, multiplexers 24 amplify the received signals and perform noise filtering on the resulting output. Multiplexers 24 may also detect synchronization data in the received signals to permit synchronous transfer of the signals to link aggregator 26. Furthermore, after any appropriate conditioning of the received signals, multiplexers 24 may format information communicated by the received signals to facilitate transmission of the information to link aggregator 26. For example, multiplexers 24 may aggregate information received from taps 22 and then form data frames containing the aggregated information for synchronous transmission to link aggregator 26. Multiplexers 24 may then packetize and encapsulate these frames for transmission to link aggregator 26 over an internet protocol (IP)/transfer control protocol (TCP) connection.

Additionally, multiplexers 24 may extract information from the received signals based on the location calculations to be completed by intercept system 20. For example, in particular embodiments, a multiplexer 24 may filter information (such as Mobile Subscriber ISDN Numbers (MSISDNs), International Mobile Subscriber Identities (IMSIs), or Temporary Mobile Subscriber Identities (TMSIs)) identifying mobile devices 50 associated with the signals received by multiplexer 24, information identifying a base station 32 (e.g., a cell identifier) with which these mobile devices 50 are communicating, information identifying a particular geographical area in which these mobile devices 50 are currently operating (e.g., a cell sector or antenna identifier), and/or any other appropriate information to be used by link aggregator in determining the location of mobile devices 50. Alternatively, multiplexers 24 may be configured to format all information received from taps 22 for transmission and transmit all such information to link aggregator 26 for processing by link aggregator 26 itself.

After any appropriate conditioning, filtering, or other processing, multiplexers 24 transmit appropriate information from the received signals to link aggregator 26. Link aggregator 26 receives the transmitted information and determines locations of mobile devices 50 served by mobile communication system 10 based on the transmitted information and/or appropriate information maintained by link aggregator 26. In particular embodiments, link aggregator 26 may itself store additional data that link aggregator 26 uses in making location determinations, such as locations of base stations 26 and historical location information for mobile devices 50. Depending on the configuration of intercept system 20, link aggregator 26 may determine locations on an ongoing basis or, alternatively, in response to location requests from an operator or other elements of intercept system 20.

Link aggregator 26 may utilize any suitable techniques for determining a location for a particular mobile device 50 and may determine a location of any appropriate form and precision. The determined location may represent an absolute location for the relevant mobile device 50 (e.g., a latitude and longitude of the mobile device 50) or a relative location, reflecting a distance between the mobile device 50 and another location, such as a known landmark. Furthermore, the determined location may reflect the location of the relevant mobile device 50 in any suitable manner including, but not limited to, by providing an estimate of the location of the mobile device 50, a prediction of the location of the mobile device 50, or the location of some other object associated with the mobile device 50 (e.g., a base station 32 serving the mobile device 50). For example, in particular embodiments, link aggregator 26 may determine a location of a particular mobile device 50 by identifying, based on information received from multiplexers 24 (e.g., a Cell Global Identity (CGI)), a cell in which the mobile device is currently communicating and determining, based on stored information, a latitude and longitude of the cell's center point or of a base station 32 serving that cell. As another example, link aggregator 26 may determine a location for the mobile device 50 based on timing information (e.g., a Round Trip Time (RTT) or Timing Advance (TA) calculation) or signal strength information (e.g., a Received Signal Strength Indication (RSSI) measurement) associated with signals transmitted to or received from the mobile device 50 by one or more base stations 32. Link aggregator 26 may use this timing or signal strength information, along with stored locations for the relevant base stations 32 or their associated cells, to determine a location for the relevant mobile device 50. In general, link aggregator 26 may utilize any appropriate information and techniques to determine any suitable form of location for the relevant mobile device 50. Moreover, in particular embodiments, link aggregator 26 may make the location determination by using information received from multiplexers 24 to request location information associated with the relevant mobile device 50 from appropriate elements of access network 30, such as a serving mobile location center (SMLC).

Depending on the functionality being implemented by a particular embodiment of intercept system 20, link aggregator 26 may then use the determined location to complete additional operations. For example, in particular embodiments, intercept system 20 may be used by an emergency service provider to determine the location for a mobile device user. In such embodiments, intercept system 20 may receive location requests from a dispatcher for the emergency service provider, and link aggregator 26 may determine the location of a particular mobile device 50 in response to each of these requests. After determining a location for the relevant mobile device 50, link aggregator 26 may then transmit the location to a computer or other device for display to the dispatcher. As another example, in particular embodiments, link aggregator 26 may determine locations for mobile devices 50 on an ongoing basis and store the determined locations in memory for some subsequent use, such as monitoring usage patterns of mobile device users. In general, intercept system 20 may utilize the determined location for network optimization, traffic management, zone-based billing, targeted advertising, law enforcement efforts, or any other suitable purpose.

Thus, particular embodiments of intercept system 20 provide a cost-effective, low-complexity solution for determining the location of a large number of mobile devices 50 in real-time. By utilizing link aggregator 26, in part or in whole, to make these location determinations, intercept system 20 may reduce the signaling that would occur on access network 30 and core network 40 to complete such determinations using conventional techniques. Additionally, offloading these determinations to link aggregator 26 may reduce less optimal use of processing resources by other elements of mobile communication system 10. As a result, certain embodiments of intercept system 20 may be highly scalable and capable of supporting a mobile communication system 10 that covers an extensive geographic area and services a significant number of mobile devices 50. Moreover, because particular embodiments of intercept system 20 can operate with base stations 32, radio controllers 34, and mobile devices 50 that utilize a wide variety of communication standards, intercept system 20 may provide a flexible, robust solution for location-based services. Consequently, particular embodiments of intercept system 20 may provide numerous benefits. Specific embodiments, however, may provide some, none, or all of these benefits.

Figure 2:
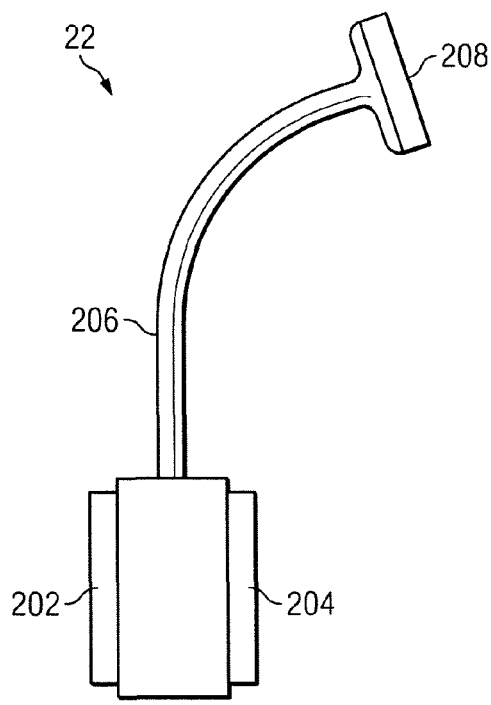
FIG. 2 is a block diagram illustrating in greater detail a tap that may be used in particular embodiments of the intercept system shown in FIG. 1.

FIG. 2 illustrates in greater detail a particular embodiment of tap 22 that may be utilized in intercept system 20. As shown in FIG. 2, tap 22 includes a first inline connector 202, a second inline connector 204, a cable 206, and a multiplexer connector 208.

First inline connector 202 and second inline connector 204 couple tap 22 to an interface or link within access network 30 or between access network 30 and core network 40. First inline connector 202 and second inline connector 204 are directly connected to one another or are coupled to each other by way of a conductive path running between inline connectors 202 and 204. As a result, a signal received on one of inline connectors 202 and 204 passes to the other and to any component attached to the other connector 202 or 204. Consequently, particular embodiments of tap 22 may be connected to access network 30 inline with a particular communication link. Signals communicated over the relevant communication link will propagate through tap 22 without downstream or upstream components on the communication link detecting the presence of tap 22 and/or changes in transmitted or received signals resulting from tap 22.

As discussed above with respect to FIG. 1, tap 22 may be designed for attachment to a number of different communication links. Thus, first inline connector 202 and second inline connector 204 may represent any connectors suitable for attachment to the relevant communication links and/or their associated interfaces. In particular embodiments, inline connectors 202 and 204 comprise D-subminiature connectors of an appropriate size and layout for coupling to the relevant communication links. For example, in particular embodiments of intercept system 20 that support GSM, tap 22 may attach to a BSC via a 44-pin connector associated with the BSC's Abis interface. In such embodiments, first inline connector 202 and second inline connector 204 may represent, respectively, male and female 44-pin DB-44 connectors. When installed, one of the inline connectors 202 or 204 will couple to the Abis connector of the BSC, while the other inline connector 202 or 204 will couple to a cable associated with the Abis interface.

Cable 206 couples multiplexer connector 208 to first inline connector 202 and second inline connector 204. Cable 206 may represent any conductive element capable of forming a conductive path between multiplexer connector 208 and inline connectors 202 and 204 and propagating signals passing between inline connectors 202 and 204 to multiplexer connector 208. In particular embodiments, cable 206 comprises a twisted pair ribbon cable.

Multiplexer connector 208 provides a conductive connection that can be coupled to a multiplexer 24. Signals received at first inline connector 202 or second inline connector 204 are replicated on multiplexer connector 208 for use by multiplexer. In particular embodiments, multiplexer connector 208 is responsible for carrying all signals received at inline connectors 202 and 204 to multiplexer 24 and, as a result, multiplexer connector 208 comprises a connector similar to inline connectors 202 and 204. Thus, in particular embodiments, multiplexer 208 comprises a D-subminiature connector of a similar size and layout to inline connectors 202 and 204.

In operation, tap 22 may be installed on an appropriate communication link within mobile communication system 10. First inline connector 202 and second inline connector 204 may be connected inline on the relevant link, while multiplexer connector 208 may be connected to a multiplexer 24 associated with tap 22. Signals received on first inline connector 202 pass to second inline connector, while signals received on second inline connector 204 pass to first inline connector 202.

Additionally, signals passing through first inline connector 202 or second inline connector 204 in either direction are replicated on multiplexer connector 208. Signals resulting from this replication carry the same information as the signals received by tap 22 but, depending on the configuration of tap 22, may differ in voltage, phase, or other characteristics. In particular embodiments, tap 22 performs this replication passively. For example, cable 206 may be connected directly to inline connectors 202 and 204 or to a conductive path connecting inline connectors 202 and 204 so that signals passing between inline connectors 202 and 204 are split and propagate along cable 206 to multiplexer connector 208. In alternative embodiments, tap 22 performs this replication actively. For example, tap 22 may include a repeater or other element that replicates a received signal by transmitting a duplicate of the received signal to multiplexer connector 208. In particular embodiments, tap 22 may replicate received signals in a manner such that received signals passing through tap 22 do not experience a substantial loss in signal level.

Figure 3:
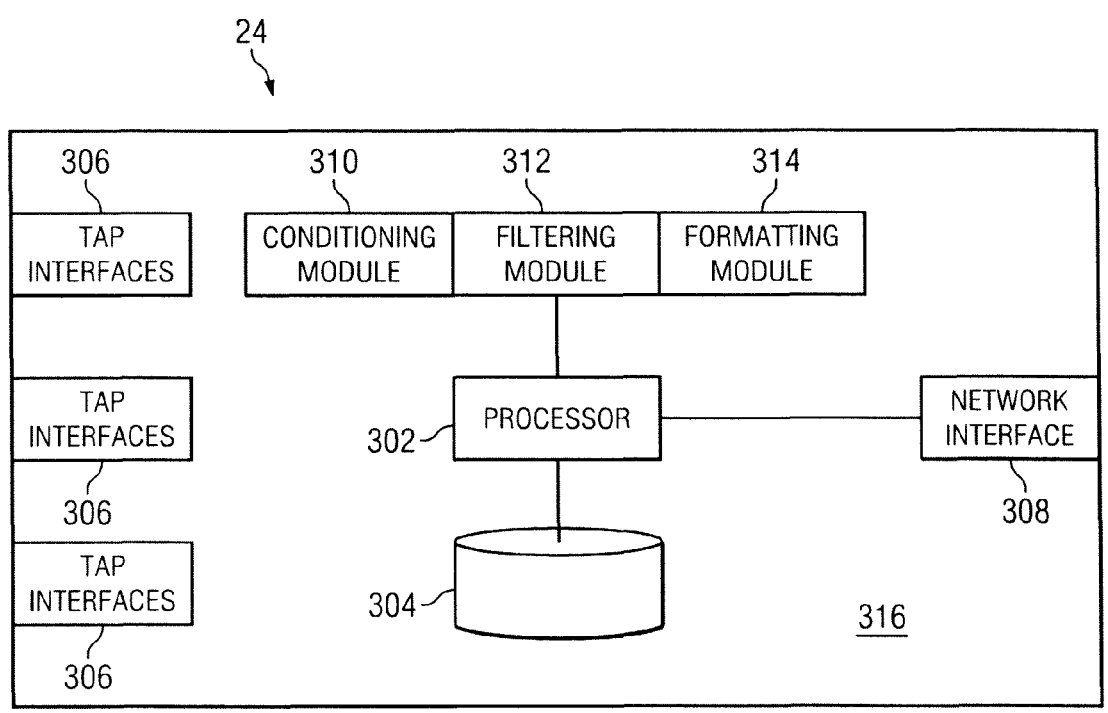
FIG. 3 is a block diagram illustrating in greater detail a multiplexer that may be used in particular embodiments of the intercept system.

FIG. 3 is a block diagram showing in greater detail the contents of multiplexer 24 according to particular embodiments. As shown, multiplexer 24 includes a processor 302, a memory 304, a plurality of tap interfaces 306, a network interface 308, a conditioning module 310, a filtering module 312, and a formatting module 314.

Processor 302 may represent or include any form of processing component, including dedicated microprocessors, general-purpose computers, or other devices capable of processing electronic information. Examples of processor 302 include field-programmable gate arrays (FPGAs), programmable microprocessors, digital signal processors (DSPs), application-specific integrated circuits (ASICs), and any other suitable specific- or general-purpose processors. Although FIG. 3 illustrates, for the sake of simplicity, an embodiment of multiplexer 24 that includes a single processor 302, multiplexer 24 may include any number of processors 302 configured to interoperate in any appropriate manner. For example, in particular embodiments, multiplexer 24 includes four FPGAs each capable of receiving and processing twenty-four (24) full E1 channels (i.e., forty-eight (48) separate transmit/receive connections). As a result, in such embodiments, multiplexer 24 may be capable of processing ninety-six (96) full E1 channels (i.e., 192 separate transmit/receive connections).

Memory 304 stores processor instructions, filter parameters, routing information, and/or any other data utilized by multiplexer 24 during operation. Memory 304 may comprise any collection and arrangement of volatile or non-volatile, local or remote devices suitable for storing data, such as random access memory (RAM), read only memory (ROM), magnetic storage, optical storage, or any other suitable type of data storage components. Although shown as a single element in FIG. 3, memory 304 may include one or more physical components local to or remote from multiplexer 24.

Tap interfaces 306 each couple multiplexer 24 to a tap 22 and receive replicated signals from the corresponding tap 22. Although shown in FIG. 3 as representing multiple separate components, tap interfaces 306 may, in particular embodiments, represent a single component capable of connecting to multiple different taps 22 and receiving signals from all such taps 22 simultaneously. If taps 22 include active components, tap interfaces 306 may provide additional functionality to facilitate communication with such active components, such as control signaling and channel setup.

Network interface 308 facilitates communication between multiplexer 24 and link aggregator 26 or other components of intercept system 20 or mobile communication system 10 over a data network. Network interface 308 may facilitate communication over portions of core network 40 or over a separate data network. In particular embodiments, network interface 308 includes or represents one or more network interface cards (NICs).

Conditioning module 310 conditions signals received from taps 22 for further processing by multiplexer 24 and transmission to link aggregator 26. Conditioning module may amplify received signals, perform noise filtering, isolate synchronization data in received signals, and/or perform any other appropriate conditioning of signals received from taps 22.

Filtering module 312 receives signals transmitted by taps 22 after any appropriate conditioning has been completed and extracts information to be transmitted to link aggregator 26. Depending on the location techniques utilized by intercept system 20, filtering module 312 may filter out cell identifiers, mobile device identifiers, timing information, signal strength indicators, and/or any other information that may be used in determining a location. As noted above, alternative embodiments of multiplexer 24 may transmit all information received from taps 22 to link aggregator 26 and such embodiments may not perform any filtering of the signals received from taps 22.

Formatting module 314 formats information for transmission to link aggregator 26 through network interface 308. In particular embodiments, formatting module 314 may aggregate information communicated by signals received from multiple different taps 22 and generate synchronous frames containing the aggregated information. Additionally, in particular embodiments, multiplexer 24 communicates with link aggregator 26 via an IP/TCP communication link. In such embodiments, formatting module 314 may packetize and encapsulate information carried by the received signals and generate any necessary addresses or other header information for communicating the resulting packets to link aggregator 26.

In general, conditioning module 310, filtering module 312, and formatting module 314 may each represent any appropriate combination of hardware and/or software suitable to provide the described functionality. Additionally, tap modules 310-314 may collectively represent a single physical component or any appropriate number of separate physical components. In particular embodiments, modules 310-314 represent, in part or in whole, software applications executing on processor 214.

In particular embodiments, the structural components of multiplexer 24 can be attached to one or more chassis 316 for mounting in a standard nineteen-inch ("19") or twenty-three-inch ("23") electronic rack. As a result, multiplexer 24 may represent a rack-mountable component that can be inserted into standard equipment racks commonly used to house telecommunications equipment in modern mobile communication systems, such as racks complying with EIA-310-D and/or EN 300 119. Thus, particular embodiments of multiplexer 24 can be easily integrated with existing equipment in many types of mobile communication systems. Furthermore, in particular embodiments, the components used to provide the functionality described for multiplexer 24 can be fit on a single chassis 316 or a collection of chassis 316 having relatively small sizes. For example, a particular embodiment of multiplexer 24 capable of collecting information from up to 448 individual E1 links (or 224 E1 transmit/receive pairs) can be formed from components attached to two chassis. The first chassis supports components for extracting information from received E1 signals and is three rack units (3U) in size. The second chassis supports components for generating and transmitting frames of extracted information and is one rack unit (1U) in size. Thus, in such embodiments, 448 E1 links can be served by a rack-mountable multiplexer 24 spanning a total of four rack units (4U) or less.

Figure 4:
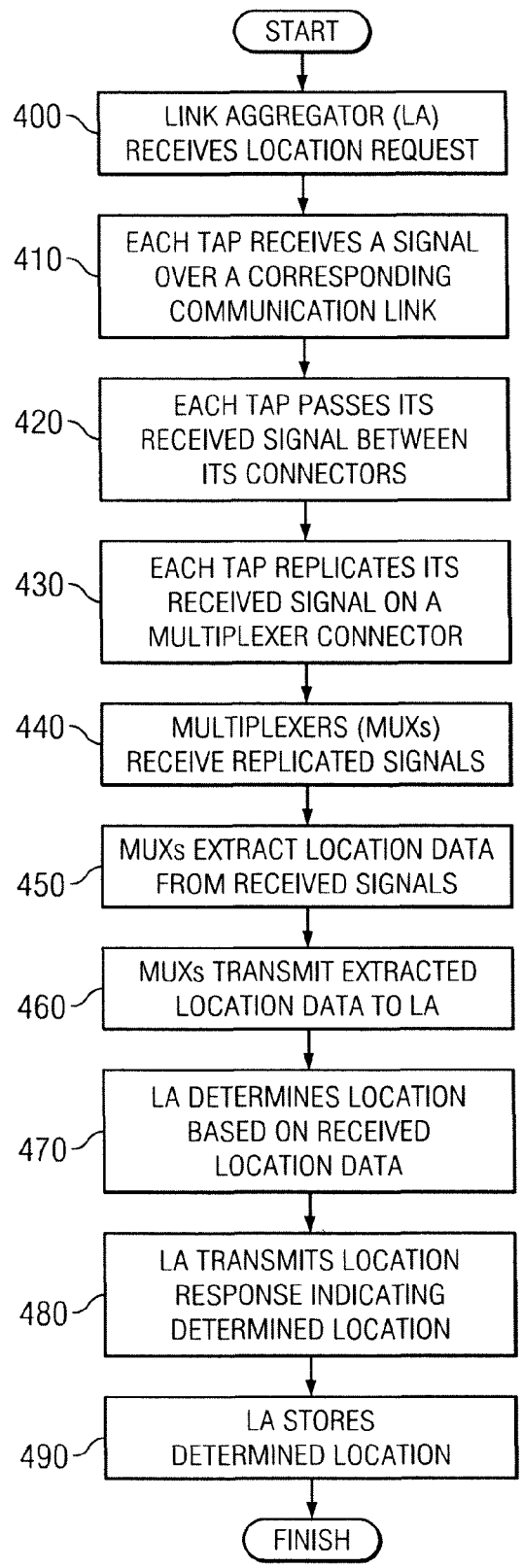
FIG. 4 is a flow chart illustrating example operation of a particular embodiment of the intercept system.

FIG. 4 is a flow chart illustrating example operation for a particular embodiment of intercept system 20. In particular, FIG. 4 illustrates example operation for an embodiment of intercept system 20 that determines locations for mobile devices 50 in response to requests received from an emergency service provider. The steps illustrated in FIG. 4 may be combined, modified, or deleted where appropriate. Additional steps may also be added to the example operation. Furthermore, the described steps may be performed in any suitable order.

Operation in this example begins, at step 400, with link aggregator 26 or another suitable element of intercept system 20 receiving a location request from a dispatcher of an emergency service provider. This location request may identify a particular mobile device 50 (e.g., by MSISDN) and include other information needed by link aggregator 26 to determine a location for the identified mobile device 50. For example, in particular embodiments, link aggregator 26 may support Hypertext Transfer Protocol (HTTP) and may receive an HTTP request from a client, such as a PC, operated by the dispatcher.

At an appropriate point before or after intercept system 20 receives the location request, intercept system 20 begins collecting information to be used in locating mobile devices 50. As part of this process, one or more taps 22 each receive, at step 410, a separate signal transmitted over a corresponding communication link of access network 30. As noted above, in particular embodiments, taps 22 may each comprise a pair of connectors 202 and 204 coupled inline to the corresponding communication link. At step 420, the one or more taps 22 pass their respective received signals between their pair of connectors 202 and 204. Additionally, at step 430, each of the taps 22 replicates the signal it received on a multiplexer connector 208 of that tap 22.

The replicated signals are received at a multiplexer 24 coupled to taps 22 at step 440. Intercept system 20 may include multiple multiplexers 24, and each multiplexer 24 may be coupled to and receive replicated signals from a different set of taps 22. At step 450, the one or more multiplexers 24 extract location data from signals received from taps 22. This location data is associated with one or more mobile devices 50 operating in a geographic area served by access network 30 and may comprise any data used by intercept system 20 to determine locations of the relevant mobile devices 50. Examples of location data may include, but are not limited to, cell identifiers, device identifiers, timing information, and/or signal strength measurements.

After any appropriate formatting of the extracted location data, multiplexers 24 transmit the extracted location data to link aggregator 26 over a data network at step 460. In particular embodiments, multiplexer 24 transmits the extracted location data to link aggregator in accordance with an internet protocol (IP). At step 470, link aggregator 26 determines a location for the relevant mobile device 50 based on location data received from multiplexers 24. As noted above, this location may represent a location associated with the relevant mobile device 50 in any appropriate manner and having any appropriate form and precision.

After determining a location for the relevant mobile device 50, link aggregator 26 may take additional steps to utilize the determined location. For example, at step 480, link aggregator 26 may transmit to the dispatcher's client a location response identifying the determined location (e.g., an HTTP response that includes a latitude and longitude for the relevant mobile device 50). The determined location may then be displayed to the dispatcher on a client monitor or otherwise communicated to the dispatcher. Additionally, at step 490, link aggregator 26 may store the determined location to facilitate data recovery or subsequent analysis of device locations. The operation of intercept system 20 with respect to determining this particular location may then end as shown in FIG. 4.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for determining a location for a mobile communication device, comprising:
    a plurality of taps, each tap comprising:
        a pair of inline connectors operable to couple inline to a communication link of a radio access network and to pass between the inline connectors a signal received over the communication link;
        a multiplexer connector operable to couple the tap to a multiplexer; and
        a cable connecting the multiplexer connector to the pair of inline connectors, wherein the corresponding tap is operable to replicate signals passing between the pair of inline connectors and to propagate the replicated signals along the cable to the multiplexer connector;

the multiplexer, comprising:
  a plurality of tap interfaces, each tap interface operable to couple the multiplexer to one of the taps;
  a network interface operable to couple the multiplexer to a data network; and
  a processor operable to:
    receive, from each tap, signals replicated by the tap;
    extract location data from the replicated signals, wherein the location data is associated with one or more mobile devices operating in a geographic area served by the radio access network; and
    transmit the location data, in accordance with an internet protocol (IP), over the data network to a link aggregator; and the link aggregator, operable to:
  receive the location data from the multiplexer; and
  determine a location for one of the mobile devices based on the received location data.

2. The system of claim 1, wherein the plurality of taps comprise a first group of taps, the location data comprises a first set of location data, and the multiplexer comprises a first multiplexer coupled to the first group of taps, and further comprising:
  a second group of taps; and
  a second multiplexer operable to:
    receive, from each of the second group of taps, signals replicated by that tap;
    extract a second set of location data from the signals replicated by the second group of taps; and
    transmit the second set of location data, in accordance with an internet protocol (IP), over the data network to the link aggregator; and wherein the link aggregator is further operable to determine a location for one of the mobile devices by determining the location based on the first set of location data and the second set of location data.

3. The system of claim 1, wherein the inline connectors of each tap are operable to couple inline to a communication link of the radio access network by coupling inline to an Abis interface of the radio access network.

4. The system of claim 1, wherein the inline connectors of each tap are operable to couple inline to a communication link of the radio access network by coupling inline to an Iub interface of the radio access network.

5. The system of claim 1, wherein the inline connectors of each tap are further operable to pass a signal received over the communication link between the inline connectors without substantially reducing a signal level of the received signal.

6. The system of claim 1, wherein each of the taps is operable to replicate signals by passively replicating signals passing between a corresponding pair of inline connectors.

7. The system of claim 1, wherein the processor is operable to extract location data from the received signals by extracting a cell global identify (CGI) from the received signals, and wherein the link aggregator is operable to determine a location of one of the mobile devices based on the extracted CGI.

8. The system of claim 1, wherein the multiplexer further comprises one or more rack-mountable chassis, and wherein the processor, the plurality of tap interfaces, and the network interface are attached to the one or more rack-mountable chassis.

9. The system of claim 8, wherein the one or more rack-mountable chassis are less than four rack units (4U) in total size.

* * * * *